United States Patent [19]

Bacardit

[11] Patent Number: 4,685,298
[45] Date of Patent: Aug. 11, 1987

[54] SYSTEM FOR GENERATING BRAKING PRESSURE

[75] Inventor: Juan S. Bacardit, Barcelona, Spain

[73] Assignee: Bendiberica S.A., Barcelona, Spain

[21] Appl. No.: 799,374

[22] Filed: Nov. 19, 1985

Related U.S. Application Data

[63] Continuation of Ser. No. 549,335, Nov. 4, 1983, abandoned.

[30] Foreign Application Priority Data

Nov. 5, 1982 [ES] Spain ......................................... 517452

[51] Int. Cl.⁴ ............................................. B60T 13/00
[52] U.S. Cl. .................................... 60/547.1; 55/325; 55/332; 55/428; 92/78; 92/168
[58] Field of Search ................. 60/547.1; 55/332, 325, 55/428; 92/78, 168 B

[56] References Cited

U.S. PATENT DOCUMENTS

| | | |
|---|---|---|
| 2,603,066 | 7/1952 | Rockwell . |
| 2,900,962 | 8/1959 | Ingres ................................ 60/547.1 |
| 2,929,215 | 3/1960 | Stelzer ............................... 60/547.1 |
| 2,929,216 | 3/1960 | Stelzer . |
| 2,957,454 | 10/1960 | Stelzer . |
| 3,013,533 | 12/1961 | Brown ................................ 60/547.1 |
| 3,075,499 | 1/1963 | Prather ............................... 60/547.1 |
| 3,408,815 | 11/1968 | Stelzer ................................ 60/553 |
| 3,426,508 | 2/1969 | McGrath ............................. 55/248 |
| 3,470,689 | 10/1969 | Gurr ................................... 55/325 |
| 3,564,849 | 2/1971 | Huruta ................................ 60/553 |
| 4,093,038 | 6/1978 | Molin .................................. 92/78 |
| 4,259,895 | 4/1981 | Owens ................................ 92/78 |
| 4,365,538 | 12/1982 | Andoh ................................ 92/107 |
| 4,400,943 | 8/1983 | Belart ................................. 60/547.1 |
| 4,450,688 | 5/1984 | Boehm ............................... 60/547.1 |
| 4,524,584 | 6/1985 | Kobayashi .......................... 60/547.1 |
| 4,531,370 | 7/1985 | Hendrickson ....................... 60/547.1 |
| 4,543,790 | 10/1985 | Coll .................................... 60/547.1 |

FOREIGN PATENT DOCUMENTS

| | | |
|---|---|---|
| 45231 | 3/1982 | European Pat. Off. ........... 60/547.1 |
| 1131534 | of 0000 | Fed. Rep. of Germany . |
| 2361258 | of 0000 | France . |
| 4323585 | of 0000 | Japan . |
| 4422133 | of 0000 | Japan ................................. 60/547.1 |
| 4639376 | of 0000 | Japan . |
| 2070172 | 9/1981 | United Kingdom ............... 60/547.1 |
| 2073345 | 10/1981 | United Kingdom ............... 60/547.1 |
| 2074268 | 10/1981 | United Kingdom ............... 60/547.1 |

*Primary Examiner*—Abraham Hershkovitz
*Attorney, Agent, or Firm*—Leo H. McCormick, Jr.; Ken C. Decker

[57] ABSTRACT

The system for generating braking pressure, consisting of a pneumatic assistance servomotor (2) mounted so as to overhang on a master cylinder (1) which it actuates by a tubular pullrod component (14) in which extends the control pushrod (11) of the distribution valve (10), incorporates a pre-assembled unitary valve assembly (10) screwed to the end of the tubular pullrod component (14) so as to connect the latter to the movable piston wall (6) of the servomotor, the valve (10) being linked by a cylindrical flexible sealing component (50) to a central annular zone (19) of the front wall (4) of the servomotor casing which is closed by a labyrinth filtering structure (80) with draining means (86).

3 Claims, 6 Drawing Figures

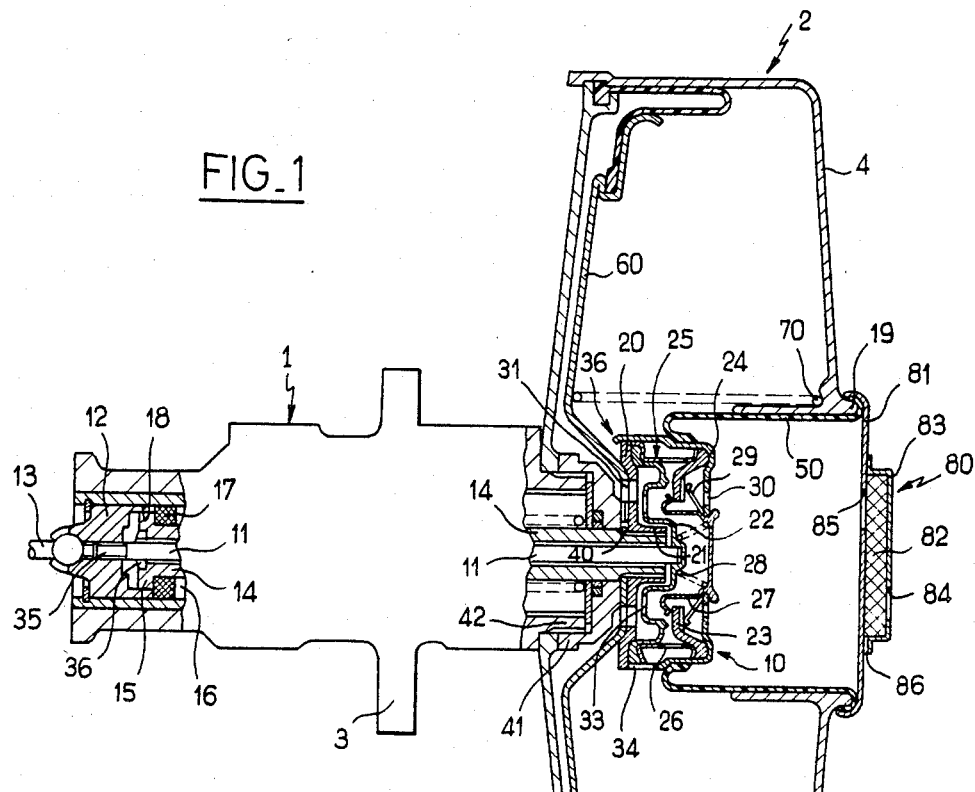
FIG_1
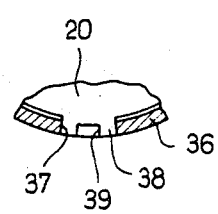
FIG_2
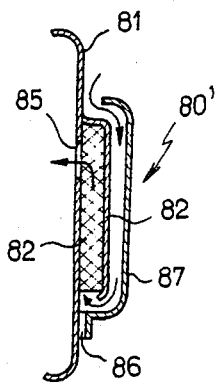
FIG_3  FIG_4

SYSTEM FOR GENERATING BRAKING PRESSURE

This is a continuation of application Ser. No. 549,335 filed on Nov. 4, 1983, now abandoned.

The present invention concerns systems for generating braking pressure, especially for motor vehicles, of the type comprising a pneumatic assistance servomotor, typically of the vacuum type, coupled to a master cylinder for at least one braking circuit of the vehicle, the servomotor consisting of a casing, a piston wall which is axially movable in the casing, dividing the latter into two chambers and coupled to at least one piston of the master cylinder by a tubular component extending axially through the master cylinder, and a three-way actuating valve positioned in a central valve body connected to the movable wall and controlled by a pushrod extending axially within the tubular component and whose end away from the valve is intended to co-operate with an input component for actuating the system.

Such a system for generating braking pressure is described in European Patent Application No. 0,045,231 corresponding to U.S. patent application Ser. No 585,015 now U.S. Pat. No. 4,543,790 in the name of the Applicant Company, the contents of which are assumed integrated here for reference. Systems of this type offer the advantage that they occupy a smaller volume in the engine compartment of the vehicle and eliminate problems arising in the region of the casing of the servomotor due to reaction forces in service, compared with, for example, conventional systems of the "series" type where the master cylinder is supported by the servomotor away from the control pushrod of the servomotor valve. However, known arrangements of this type of system involve a degree of complexity as regards the manufacture and assembly of the valve components in the central part of the movable wall forming a piston and as regards the firm fixing of the latter to the tubular component coupled to the piston of the master cylinder.

An object of the present invention is to propose a system of the type defined above in an arrangement overcoming these disadvantages and enabling rapid and reliable assembly of the working components of the servomotor while simplifying manufacture.

To achieve this, according to a feature of the invention, the valve body is constructed in the form of a unitary valve assembly mounted on the tubular component so as to connect the movable bulkhead to the latter. More specifically, the unitary valve assembly is advantageously screwed onto the end of the tubular component, the movable wall being immobilised between the unitary valve assembly and an external shoulder of the tubular component.

With such an arrangement, the movable wall may be constructed very simply and very economically, likewise for the pre-assembled unitary valve assembly the fitting into position or interchanging of which may be carried out very rapidly and at minimum cost.

Systems for generating braking pressure of the type according to the invention, intended to be mounted, in the region of the master cylinder, on the bulkhead of the vehicle separating the engine compartment from the driving compartment, make use of a communication of the actuating valve with the atmosphere in the region of the front wall of the servomotor casing, that is to say inside the engine compartment, unlike conventional systems of the "series" type where this communication is made on the other side, in the driving compartment of the vehicle, through the bulkhead support. Now, the engine compartment offers a much harsher environment than the driving compartment, due particularly to splashing water or other liquid or solid contaminant particles from below the body. Actuating valves of assistance servomotors are conventionally provided, in the intake passage for atmospheric air, with a filter disc of a cellulose or fibrous material. However, due to the quantities of liquid particles in the atmosphere in the engine compartment, these conventional filters can carry the risk of choking or rapid saturation.

Another aim of the present invention is to propose, for a system for generating braking pressure of the type defined above, a filtering structure enabling these disadvantages to be overcome and enabling the filtration qualities of the filter to be preserved during an extended life.

To achieve this, according to a feature of the invention, a filtering structure is provided which is mounted typically on a central opening of the front shell of the servomotor casing, defining a labyrinth passage and a means for draining off liquid.

Other features and advantages of the present invention will emerge from the following description of embodiment, given by way of illustration, with reference to the accompanying drawings, in which:

FIG. 1 is a view partially in longitudinal cross-section of a system for generating braking pressure according to the invention;

FIG. 2 is a partial front view showing a construction detail at the periphery of the base of the unitary valve assembly;

FIGS. 3 and 4 are detail views showing variants of construction of the filtering structure of the servomotor.

Figure 5:
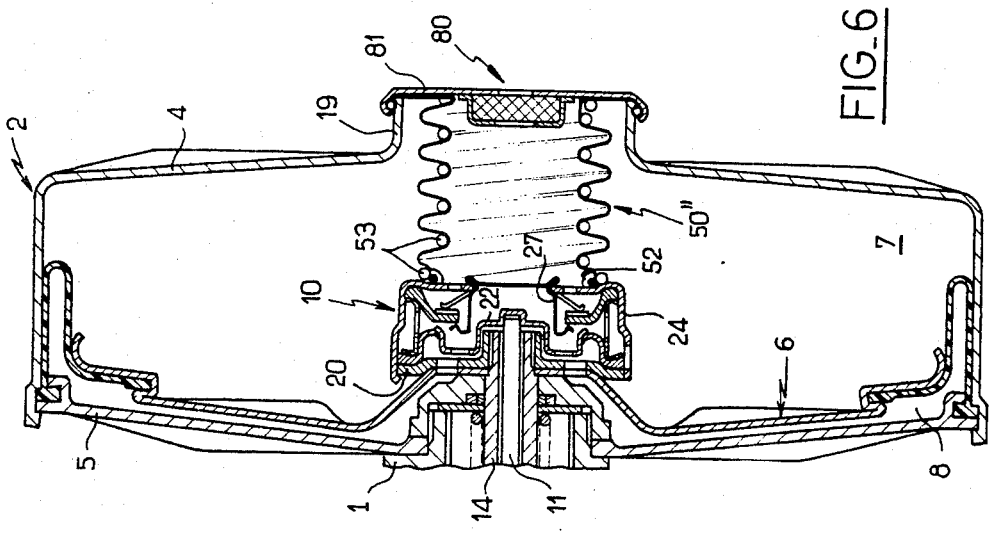
FIGS. 5 and 6 illustrate variants of the flexible sealing component connecting the unitary valve assembly to the front wall of the casing.

In the description which follows and in the drawings, identical or similar components carry the same reference numbers, which may be primed. Generally, the terms "front" and "rear" refer to the right and left portions respectively in the drawings thus conforming to the conventional orientation of a motor vehicle.

The system for generating braking pressure according to the invention consists of the assembly of a master cylinder 1 and a pneumatic assistance servomotor 2 mounted so as to overhang on the front end of the master cylinder 1, which incorporates means, such as a collar 3, for mounting the system on a fixed bulkhead (not shown) of a motor vehicle. In accordance with the general arrangement described in European Application No. 0,045,231 corresponding to copending U.S. patent application Ser. No. 585,015 now U.S. Pat. No. 4,543,790 mentioned above, the servomotor 2 consists of a casing formed by the peripheral assembly of a front shell 4 and a rear shell 5, a movable wall forming a piston 6 dividing the interior of the casing into two chambers, typically a front or vacuum chamber 7 and a rear or working chamber 8. A three-way valve means 10 is connnected to the movable wall 6 and is controlled by a pushrod 11 passing axially through the master cylinder 1 so as to co-operate with a plunger or input component 12 for actuating the system, mounted so as to slide in the rear end portion of the master cylinder 1 and to which is coupled the operating pushrod 13 connected to the brake pedal of the vehicle (not shown).

The movable wall 6 is firmly fixed to a tubular pullrod component 14 also passing axially through the master cylinder and surrounding the control pushrod 11 to co-operate, typically by means of a rear end collar 15 extending radially outwards, which the primary piston 16 of the master cylinder via an annular reaction disc 17 against which the actuating plunger 12 also bears, peripherally, for example, by means of a tubular extension 18.

In accordance with the invention, the valve means 10 takes the form of a preassembled unitary valve assembly mounted on the front end of the tubular pullrod component 14 and connected to an annular central end zone 19 of the front wall 4 of the servomotor 2 by a flexible sealing component 50, 50′ or 50″. The movable wall 6 consists of a piston plate 60 advantageously made of sheet metal and a peripheral rolling diaphragm 61 made of elastomeric material. The front end of the tubular component 14 is threaded and has an external radial shoulder 40 behind the thread. The plate of the piston 60 is provided with a central bore which is positioned over the front end of the tubular component 14 so as to bear against the shoulder 40. The valve assembly 10 incorporates a flange or annular rear base 20 forming an inner tapped sleeve 21 intended to be screwed on the threaded end of the tubular component 14. The valve assembly 10 is provided with a first axially movable valve means 22 consisting of a central portion stamped from sheet metal onto which is moulded peripherally an elastic diaphragm which is held at its periphery against the periphery of the annular base 20, together with a second valve means 23 made of centrally reinforced elastomeric material mounted at its periphery in a valve cover 24 in the form of a cup whose peripheral rim is mounted on the base 20 in a way which will be described in detail later. The two valve means are retained in position peripherally by a cylindrical strut 25 provided with outlet holes 26 between the two valve means. The valve assembly is completed by a central profiled sleeve in the form of a cup 27 crimped or rivetted in a central opening in the front wall of the cover 24. The first valve means 22 is pushed towards the edge, in the direction of the master cylinder, by a spring 28 which bears against the front wall forming a base of the sleeve 27 while a star-shaped spring 29, bearing against the front wall of the cover 24, pushes the second valve means 23 against the seat formed by the lipped edge, which is folded towards the front, of the cylindrical portion of the sleeve 27, in the rest position shown in the figures. In this rest position, the first valve means 22 is separated from the second valve means 23 which forms a movable seat for this first valve means 22. In this rest position, atmospheric air, reaching the valve 10 via a filtering structure 80 which will be described in detail later, and through openings 30 formed in the front wall of the cover 24, occupies a first chamber defined by the second valve means 23, the central sleeve 27 and the cover 24. Similarly, the working chamber 8 communicates with the vacuum chamber 7 (connected, in a manner which is in itself known, to a vacuum source of the vehicle) through a passage formed by the openings 31 in the central portion of the piston plate 60, connecting openings 32 (FIG. 5) in the base 20, the inner chamber defined between the first valve means 22 and this base 20, openings 33 formed in the first valve means, the intermediate chamber between the two valve means, the openings 26 in the strut 25, and openings 34 formed in the cylindrical rim of the cover 24. In the mounting position, shown in the drawings, the front end of the control pushrod 11 bears against the central part of the flange of the first valve means 22, possibly provided with a tubular housing for this purpose. The control pushrod 11 may be dimensioned so as normally to come into contact with the front face of the plunger 12 as described in European Patent Application No. 0,045,231 and U.S. Patent Application Ser. No. 585,015, the initial adjustment then being carried out by measurement of accurate dimensions of the whole of the system. Preferably, in accordance with the invention, the rear end 35 of the pushrod 11 is threaded and inserted into a tapped hole in the plunger 12, the initial adjustment then being carried out by relative rotation of these two components. With such an arrangement, an annular seal 36 is advantageously provided between the pushrod 11 and the tubular pullrod component 14.

In operation, when the pushrod 11 is moved to the right following an increment of pressure of the control rod 13, the rod 11 moves the first valve means 22 to the right against its return spring 28 so as to bring it to bear, at first, against the second valve means 23, thus cutting off the communication between the two chambers 7 and 8 of the servomotor. An additional pressure on the rod 11 caquses the first valve means 22 to separate the second valve means 23 from it seat, consisting of the sleeve 27, against the spring 29, so that atmospheric air is admitted into the working chamber 8 via the intermediate chamber of the valve and the openings 33, 32 and 31. The differential pressure thus created either side of the movable bulkhead 6 moves the latter forwards so as to actuate the master cylinder with the desired assistance force via the tubular pullrod component 14.

In accordance with a feature of the invention, the free edge of the cylindrical rim of the cover 24 is crimped, as shown at 36, on the periphery of the annular base 20. However, to enable the unitary valve assembly 10 to be screwed onto the threaded front end of the tubular component 14, the cylindrical rim of the cover 24 has slots 37, spaced angularly, in which fingers 38 lie projecting radially outwards from the annular base 20, forming between them gaps 39, thus unaffected by the crimping of the cover and serving as a guide for a tool for screwing the valve assembly 10 onto the tubular component 14, this screwing action firmly fixing the plate 60 of the movable bulkhead 6 to the tubular component 14. As may be seen in FIG. 1, some of the openings 31 in the support plate 60 may be extended radially so as to co-operate with alignment porjections of the annular base 20 in order to ensure alignment of the outlet openings 31 and 32. In the embodiments shown, the rear wall of the shell 5 is held fast between the body of the master cylinder 1 and a cover of the master cylinder 41 screwed onto the threaded front end 42 of the master cylinder body, the cover 41 forming the stop for the end of the return travel for the movable bulkhead 6/valve assembly 10 combination. In the embodiment shown in FIG. 1, the flexible sealing component 50 consists of an elastic rolling diaphragm retained on an axial projection formed in the region of the annular central end zone 19 of the front wall 4 and onto which is crimped the support plate 81 of the filtering structure 80, the return spring 70 of the movable bulkhead 6 bearing against the front wall 4 in the region of this axial projection.

The filtering structure 80 of the embodiment shown in FIG. 1 consists of a filter disc 82 retained between the support plate 81 and a cover 83 having an air inlet opening 84 offset from the outlet opening 85 formed in the support plate 81, an outlet for drainage 86 being arranged between the lower portion of the cover 83 and the support plate 81.

In the embodiment shown in FIG. 3, the filtering structure 80' incorporates, in addition to the cover 83 for retaining the filter 82, an additional labyrinth plate 87 at the base of which the outlet for drainage 86 is arranged. The paths followed by the atmospheric air are indicated by arrows. The variant of the filtering structure 80" shown in FIG. 4 differs from the preceding type in that it incorporates in addition to the filtering plate 87 orientated upwards, a second front labyrinth plate 88 orientated downwards.

Figure 6:
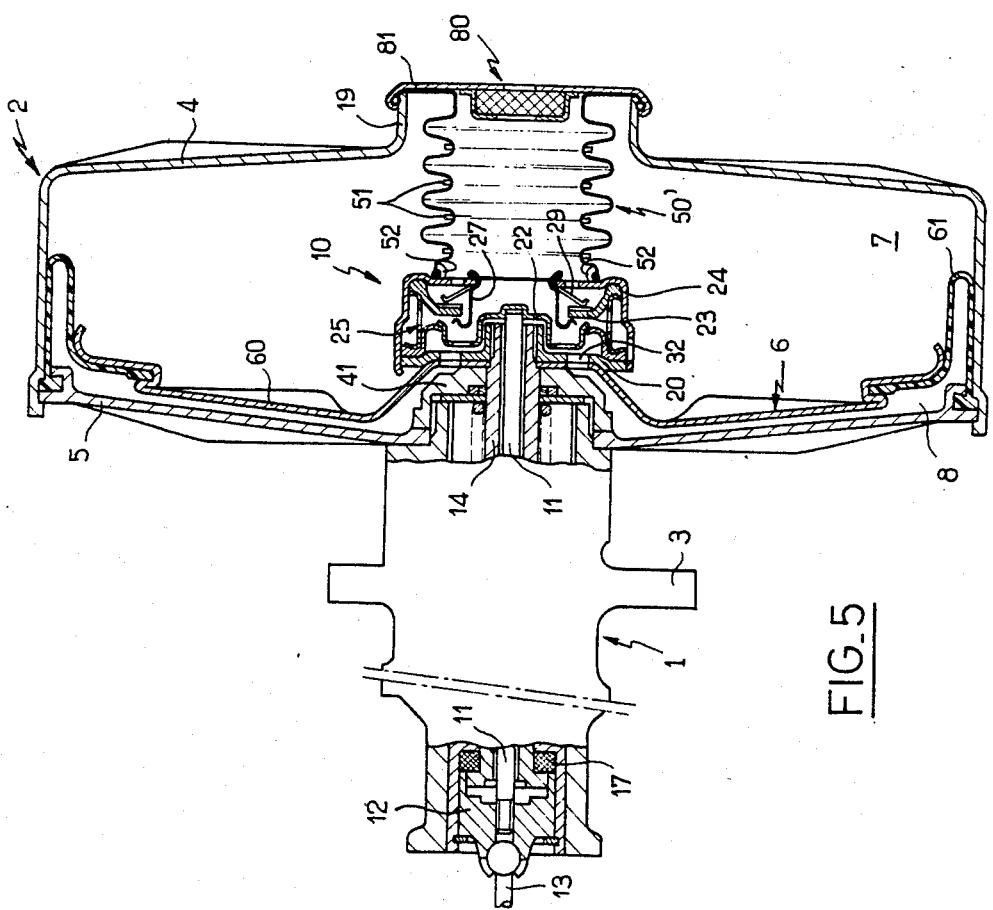

In the embodiment shown in FIG. 5, the flexible sealing component 50' consists, in this case, of a bellows reinforced by rings 51, the inner end of the bellows 50' being mounted on fingers folded outwards 51 from the front wall of the cover 24 and its outer end being trapped between a central annular extension 19 of the front wall 4 of the servomotor casing 2 and the support plate 81 of the filtering structure 80. The embodiment shown in FIG. 6 is similar to that of FIG. 5 except that the bellows 50" has convolutions developed as a screw thread, the reinforcing rings being replaced, in this case, by a helical spring 53 bearing against the support plate 81 of the filtering structure 80 and able to serve as a substitute for the return spring 70 of the movable bulkhead 6. Compared with the embodiment with a rolling diaphragm shown in FIG. 1, the sealing structures with bellows enable the inside surface area of the servomotor which is exposed to atmospheric pressure to be reduced, thereby increasing the effective surface area of the servomotor piston.

Although the present invention has been described in relation to particular embodiment, it is not limited thereto but on the contrary is capable of modifications and variants which will be apparent to those skilled in the art.

What is claimed is:

1. A brake control unit for an automotive vehicle, comprising:
   a low pressure booster with a hermetically closed housing having two opposite walls; and
   a brake master cylinder having a housing connected to a first of said opposite walls and at least a primary piston slidingly received within said master cylinder housing;
   a movable piston wall dividing interiorly said closed housing into a vacuum chamber to be permanently connected to a vacuum source and a control pressure chamber adjacent said first wall of said closed housing, said piston wall being connected to said primary piston by a tubular traction member extending longitudinally through said master cylinder, said piston wall being movable axially in response to actuation of a control valve by a control rod extending slidably within said tubular traction member and having one end, opposite to said control valve, actuatable by an actuation member for actuating the unit, said control valve being arranged centrally on said movable wall and selectively controlling communication of the control pressure chamber with the atmosphere, said control valve being in permanent communication with the atmosphere via an opening formed centrally in the second of said opposite walls of said booster housing, said control valve having an annular mounting base with a central portion and a peripheral portion, and a cover attached to said peripheral portion of said mounting base and enclosing valving means operable by said control rod, said mounting base being attached by its said central portion to an end portion of said tubular traction member and thereby retaining said piston wall on said tubular traction member, said central portion of said mounting base being screwed to said end portion of said tubular traction which extends through a central opening in said piston wall, said piston wall being retained on said tubular traction member between an external shoulder of said tubular traction member and said mounting base;
   a flexible sealed conduit sealingly connecting said cover of said control valve assembly to said opening in said second wall of said closed housing;
   a cover connected to said annular opening, said cover means having an inlet through which air is communicated to said annular opening and a drain port; and
   filter means retained by said cover for removing contaminant particles from said air, said drain port allowing said particles to be removed to reduce saturation of said filter by the contaminants.

2. The unit of claim 1, wherein said cover means further includes:
   a labyrinth plate located in said inlet to increase the flow path for the air to aid in precipitating out said particles prior to the air being communicated to said filter.

3. The unit of claim 1, wherein said cover further includes:
   slots for receiving fingers extending from the mounting base to maintain internal alignment of passages within said closed housing.

* * * * *